(12) United States Patent
Merritt

(10) Patent No.: US 7,152,572 B2
(45) Date of Patent: Dec. 26, 2006

(54) INTERNAL COMBUSTION ENGINE

(75) Inventor: Dan Merritt, Coventry (GB)

(73) Assignee: Musi Engines Limited, Coventry (GB)

( * ) Notice: Subject to any disclaimer, the term of this patent is extended or adjusted under 35 U.S.C. 154(b) by 18 days.

(21) Appl. No.: 10/529,529

(22) PCT Filed: Nov. 16, 2004

(86) PCT No.: PCT/GB2004/004828

§ 371 (c)(1),
(2), (4) Date: Mar. 29, 2005

(87) PCT Pub. No.: WO2005/052335

PCT Pub. Date: Jun. 9, 2005

(65) Prior Publication Data

US 2006/0169241 A1    Aug. 3, 2006

(30) Foreign Application Priority Data

| Nov. 19, 2003 | (GB) | ................. | 0326916.4 |
| Dec. 9, 2003 | (GB) | ................. | 0328471.8 |
| Dec. 17, 2003 | (GB) | ................. | 0329289.3 |
| Dec. 24, 2003 | (GB) | ................. | 0329989.8 |
| Feb. 28, 2004 | (GB) | ................. | 0404549.8 |
| Mar. 15, 2004 | (GB) | ................. | 0405735.2 |
| Jun. 5, 2004 | (GB) | ................. | 0412627.2 |

(51) Int. Cl.
*F02B 19/00* (2006.01)
*F02B 31/00* (2006.01)

(52) U.S. Cl. ...................................... 123/253; 123/262

(58) Field of Classification Search ................ 123/253, 123/260, 261, 262, 263, 286
See application file for complete search history.

(56) References Cited

U.S. PATENT DOCUMENTS

| 4,038,952 | A | | 8/1977 | Nagano | |
| 4,332,224 | A | * | 6/1982 | Latsch et al. | ................ 123/254 |
| 4,351,294 | A | * | 9/1982 | Giddings | .................... 123/291 |
| 4,594,976 | A | * | 6/1986 | Gonzalez | .................... 123/260 |
| 4,765,293 | A | * | 8/1988 | Gonzalez | .................... 123/275 |
| 5,067,457 | A | * | 11/1991 | Shinzawa | .................... 123/269 |
| 5,086,735 | A | * | 2/1992 | Melchior et al. | ...... 123/65 VD |
| 5,243,940 | A | * | 9/1993 | Gopel | ......................... 123/299 |
| 5,307,772 | A | * | 5/1994 | Rao et al. | .................... 123/272 |

FOREIGN PATENT DOCUMENTS

| DE | 1 034 915 B | 7/1958 |
| GB | 2 123 482 A | 2/1984 |
| JP | 61 135924 A | 6/1986 |

* cited by examiner

*Primary Examiner*—John T. Kwon
(74) *Attorney, Agent, or Firm*—Pedersen & Co., PLLC; Ken J. Pedersen; Barbara S. Pedersen

(57) ABSTRACT

A high thermal efficiency lean-burn spark-ignition two or four stroke engine operable unthrottled suitable for vehicles using gasoline. It uses an indirect combustion chamber and a transfer orifice aligned to produce a jet of air moving in helical swirl motion around the chamber during the compression stroke. Fuel is injected into the chamber aimed into the air jet to assist rapid vaporization. The position and orientation of the fuel injector ensures that fuel arrives near the spark plug even under idling conditions and the helical swirl flow ensures the stratification of the ignitable mixture formed near the plug.

10 Claims, 7 Drawing Sheets

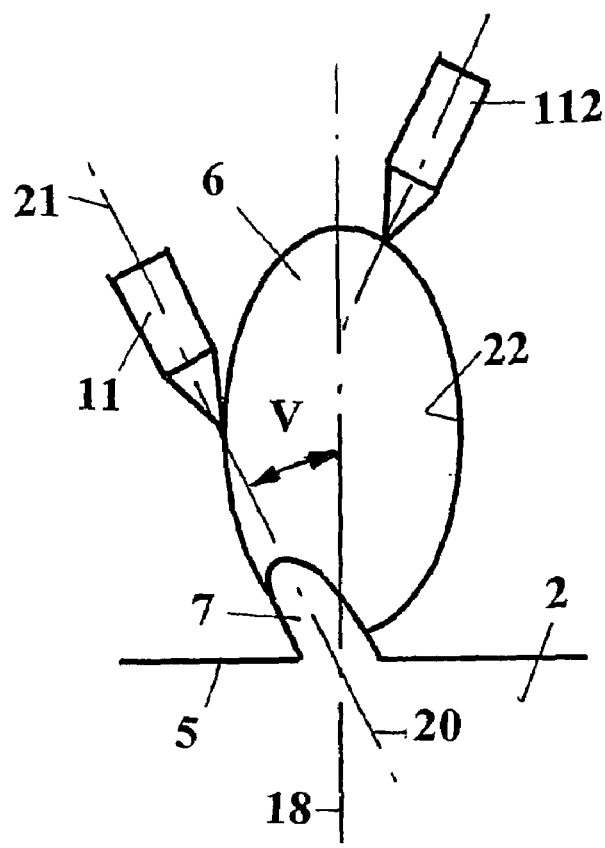
SECTION A-A    FIGURE 5
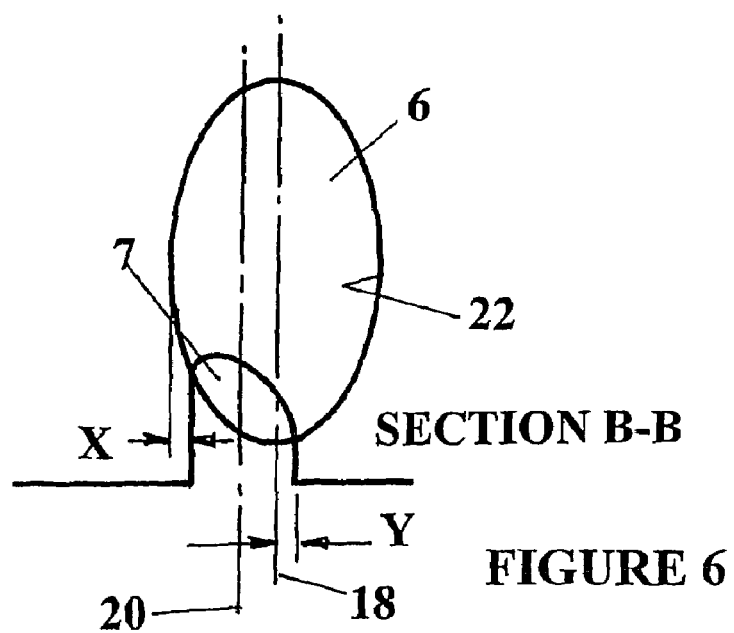
SECTION B-B
FIGURE 6

INTERNAL COMBUSTION ENGINE

This invention relates to spark ignited reciprocating internal combustion engines operating either on the four stroke or on the two stroke engine cycles.

In particular it relates to lean-burn gasoline engines using stratified charge methods. The engine can operate at part load without restricting the air intake in order to promote higher thermal efficiency at part load.

This invention is suitable for use in automotive and motor-cycle applications and has a potential to enable large savings of fuel used in urban transport. Given a suitable design according to this invention the difficult technical problem of operating a spark ignited engine unthrottled may be overcome over the full operational range of the engine.

An engine according to this invention can be constructed to operate either on the four stroke engine cycle or on the two stroke engine cycle.

Accordingly this invention provides an internal combustion engine comprising;
a piston reciprocating in a cylinder;
air inlet means communicating with the cylinder;
exhaust means communicating with the cylinder;
an indirect combustion chamber communicating with the cylinder comprising a near end and a far end in relation to the piston;
a transfer orifice communicating with the cylinder and the combustion chamber at its near end;
spark ignition means communicating with the combustion chamber;
a fuel injector communicating with the combustion chamber;
a controller to control the fuel injection process and spark ignition;
characterised in that the transfer orifice is adapted to deliver a jet of air into the combustion chamber during the compression stroke of the piston forcing gas movement around the periphery of the combustion chamber in helical swirl motion in the axial direction away from the near end and in that the fuel injector delivers fuel into the said jet of air to enable a spark ignitable mixture to form in the gas arriving at the spark ignition means.

Preferably the combustion chamber is symmetrical about a central axis, for example cylindrical, but other shapes can be used to advantage. The periphery may be smooth, or serrated or undulating in order to promote turbulence.

Preferably the fuel injector is an electrically actuated injector capable of withstanding combustion conditions and injecting into pressurised gas at up to forty bars.

Preferably the controller provides control of both the timing and duration of fuel injection and where necessary also the pressure of fuel supplied to the fuel injector.

The term air is used herein to describe air which is either pure or contains other gases such as products of combustion or even hydrocarbon gases. The term mixture describes air mixed with vaporised fuel destined for combustion. The term lean mixture is used to describe an air and fuel mixture that is not ignitable directly by the spark ignition means used in the engine.

The term near end herein describes the end of the combustion chamber situated nearer the piston and the transfer orifice. The term far end herein describes the end of the combustion chamber situated opposite the near end, furthest from the transfer orifice.

The term chamber herein describes the combustion chamber and the term orifice describes the transfer orifice.

The term lean burn is used herein to describe the ability of an engine to perform with an overall lean mixture by using stratification.

The term helical swirl is used herein to describe gas movement in the combustion chamber induced by the air jet emerging from the orifice, the jet is aimed with a tangential velocity component to produce rotation around the periphery of the combustion chamber as well as an axial velocity component to produce cork screw like motion towards the far end of the combustion chamber. On reaching the far end the gas continues in its peripheral rotation and the gas arriving from behind presses against the gas in front as its axial momentum is absorbed. It is understood that this causes some of the gas arriving later to remain at least partially separated from the gas which arrived earlier, so providing a degree of stratification.

The term stratification is used herein to describe gas movements which promote a non-homogeneous cohabitation of fuel and air within the combustion chamber volume so that a spark ignitable mixture ends up near the spark plug when the piston is at or near the end of the compression stroke and air or lean mixtures end up elsewhere within the combustion chamber.

The term air jet is used herein to describe the air as it enters the combustion chamber through the orifice during the compression stroke of the piston.

The term ignition pot is used herein to describe a cavity, with a free volume, containing a spark plug at one end, the volume communicates with the combustion chamber through a hole of a diameter smaller than the diameter of the sparkplug threaded portion.

The term BMEP describes the brake mean effective pressure developed in the cylinder.

An engine constructed according to this invention must use the three devices listed below to perform lean-burn over at least part of its operational range.

1. It uses an indirect combustion chamber where fuel entry and ignition take place and utilises the air jet to assist in the rapid vaporisation of fuel spray.
2. It uses the position, orientation and size of the orifice to promote helical swirl in a suitably constructed combustion chamber in such a way that a mixture formed within this swirling flow following fuel injection arrives at a suitably positioned spark plug at the moment of ignition.
3. It uses a fuel injector placed in a position which allows at least some of the fuel spray to be delivered into the air jet or helical swirl flow formed by the air jet.

The fuel injector may be positioned to deliver a spray which intersects perpendicularly across the air jet or at any angle to it or it may deliver fuel axially into the air jet.

The air jet reaches maximum momentum towards the end of the compression stroke and the air jet's velocity also increases with engine speed. Depending on fuel injector design fuel spray delivered at the beginning of the compression stroke or earlier, particularly at lower engine speeds, may penetrate beyond the air jet but such fuel can be absorbed into the air later on.

Spark plugs should be positioned where an ignitable mixture is formed just before the moment of ignition. The position depends on the location and orientation of the fuel injector and particularly on the timing of fuel injection relative to piston position, which can be described alternatively by the crank-angle location. The spark plug should be shielded from high velocity gas and from the direct path of fuel spray. Such shielding can be provided by using an ignition pot.

This invention is further described herein by way of examples with reference to accompanying schematic diagrams which are not drawn to scale and are presented for illustrations purpose only.

FIG. 5 illustrates a section along the line A—A of FIG. 4 of a similar combustion chamber showing orifice location and a third position for the fuel injector.

FIG. 6 illustrates another section along the line B—B of FIG. 4 of the combustion chamber showing the effect of the location of the orifice on the intensity of helical swirl.

Figure 1:
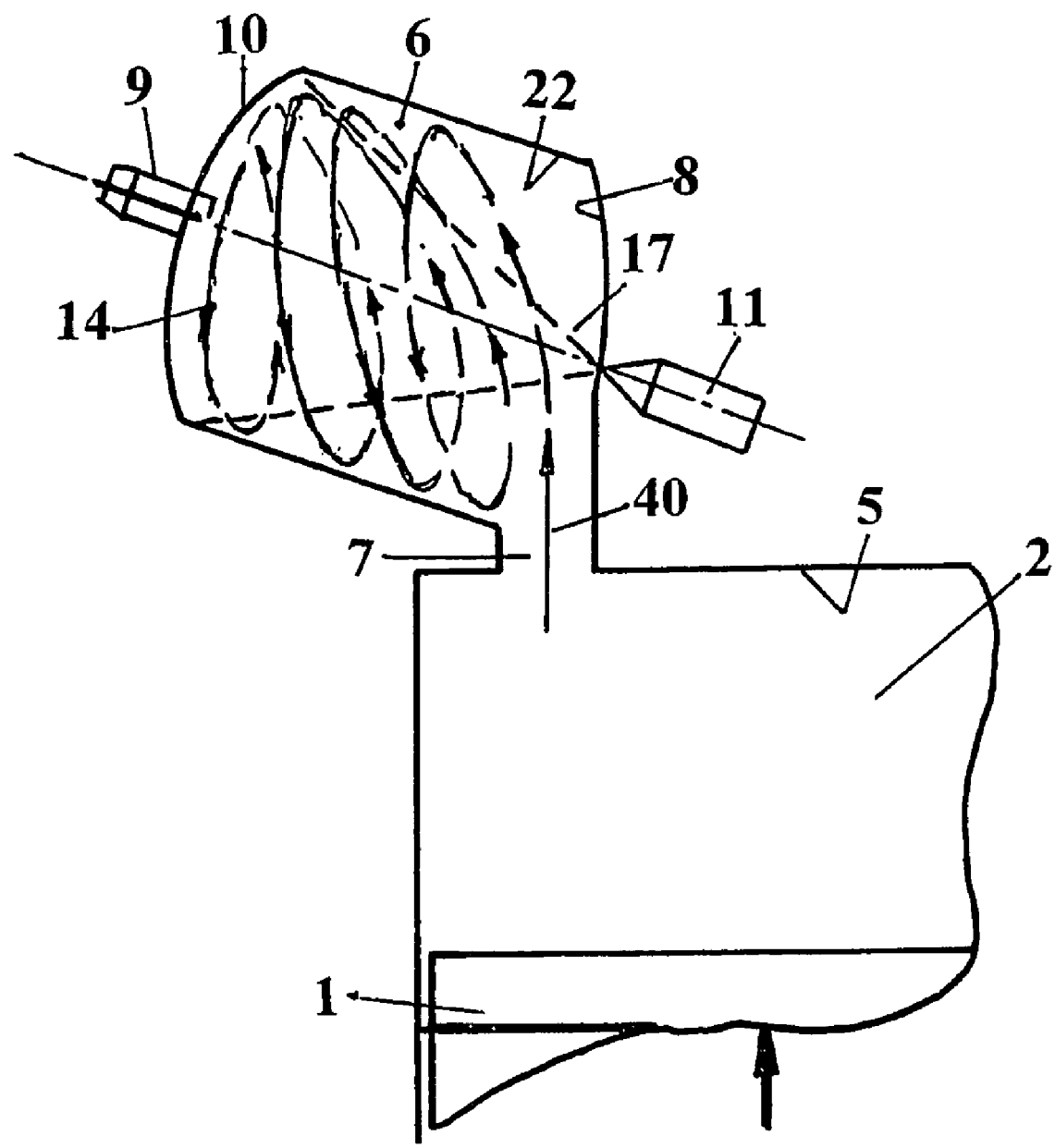
FIG. 1 is a sectional elevation through part of a cylinder and a combustion chamber inclined to the axis of the cylinder illustrating a stream line undergoing helical swirl flow pattern.

FIG. 1 shows by way of an example one embodiment in which piston 1 moves in cylinder 2 during the compression stroke. The combustion chamber 6 communicates with the cylinder through orifice 7. The fuel injector 11 delivers fuel across the air jet 40. The fuel cone is shown to intersect the air jet and to extend to the full diameter of the cylindrical combustion chamber when it reaches the far end 10 where the spark plug 9 is situated. The diagram also illustrates a stream line 14 rotating around the periphery 22 of the combustion chamber in helical swirl motion. This embodiment avoids fuel delivery directly into cylinder 2 so reducing hydrocarbon emissions to a minimum. An engine constructed in this way was found to be capable of unthrottled operation even at idling and low BMEP. At idling and other low BMEP conditions a small quantity of fuel is injected early in the compression stroke and is understood to pass through the weak air jet to be deposited on the far wall of the combustion chamber 10 and/or the periphery 22 near the far end. When the helical swirl air arrives at the far end it vaporises this deposited fuel and the resulting mixture was found to remain near the far end until the moment of ignition by the spark plug 9. It will be understood that the position of the spark plug can be varied by the engine designer for optimum performance.

At higher BMEP conditions the duration of fuel injection is increased over longer crank-angle arc and as a result an increased amount of mixture is contained within the gas extending from the far end 10 towards the near end 8. Under these conditions more fuel will be absorbed into the air jet 40 flowing across the fuel spray 17, as the air jet's momentum increases. As engine speed increases fuel line pressure may need to rise to allow the required amount of fuel to be delivered during the available crank-angle arc period. The engine designer can select the best combination for fuel injection timing, duration and pressure under various engine conditions and select a suitable location for the spark plug 9. The engine management system 12 (see FIG. 2) can be programmed accordingly.

Figure 2:
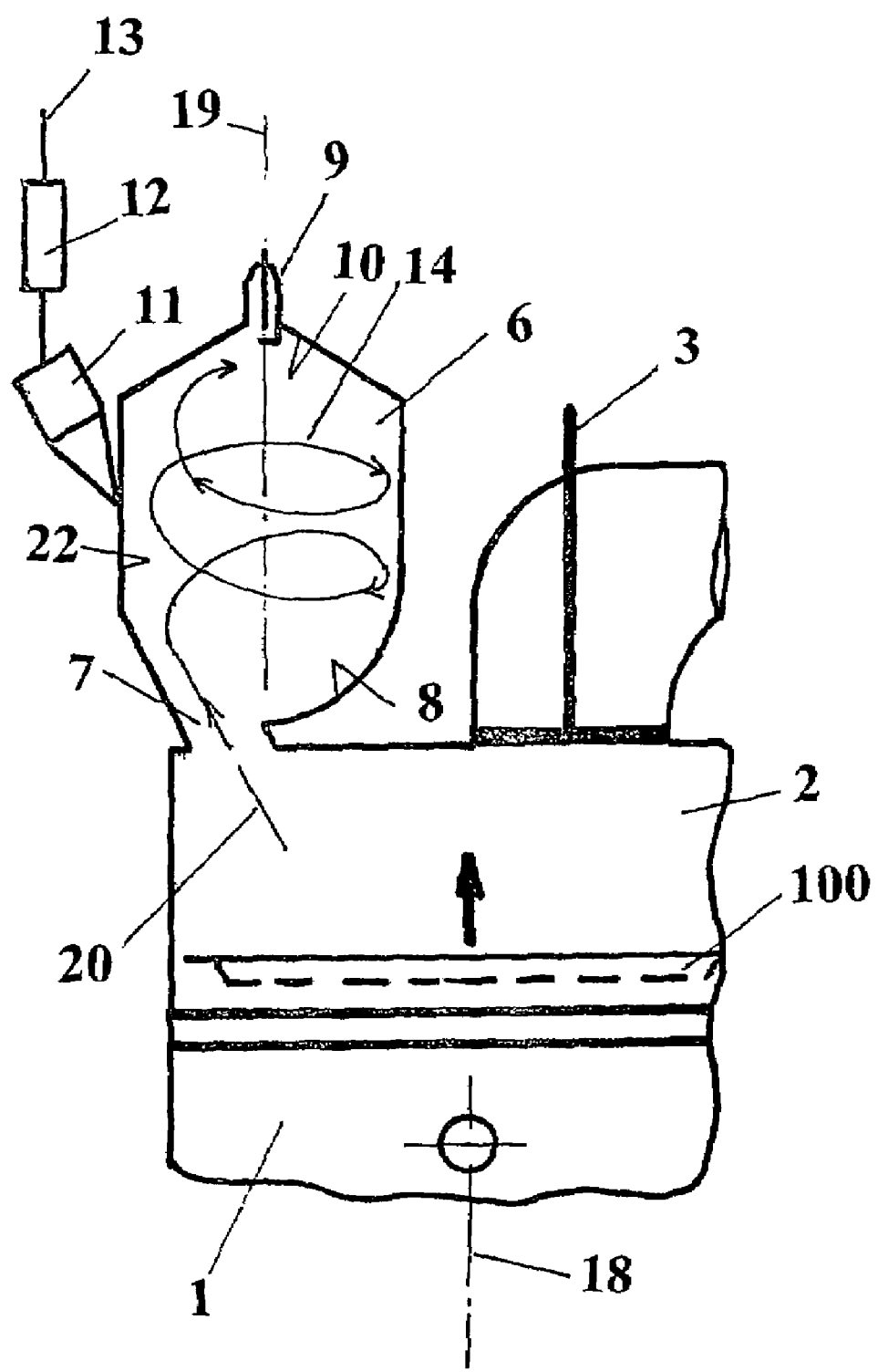
FIG. 2 is a sectional elevation through part of a cylinder and combustion chamber which is aligned with the axis of the cylinder, representing another embodiment of an engine constructed according to this invention.

FIG. 2 shows another embodiment according to this invention, by way of an example. It shows piston 1 moving in cylinder 2, during the compression stroke, along axis 18 which is parallel with the chamber's axis 19. Cylinder 2 communicates with inlet and exhaust valves in known fashion, both represented by poppet valve 3. The combustion chamber 6 is cylindrical with a conical far end 10 where spark plug 9 is situated. The orifice 7 is inclined to the axis 19 and enters the chamber 6, at the near end 8, with a direction having both axial and tangential components. The tangential component is not illustrated in this diagram. The air jet entering the chamber 6 is illustrated by vector 20 which changes direction to flow around the wall of the chamber 22, in a helical swirl pattern as illustrated by streamline 14. The piston crown has an optional cavity 100 which allows some mixture to burn over the piston, if the engine designer wishes this to take place.

The engine controller 12 determines the timing and duration of fuel injection, the fuel line pressure and the timing of spark ignition. The fuel line 13 is shown passing through it for illustration only.

The engine illustrated in FIG. 2 is different from the one shown in FIG. 1 in that it shows a fuel injector 11 aligned with the axis of orifice 7 allowing fuel sprays to be injected into the air jet 20 co-axially and in the opposite direction. This can promote very rapid vaporisation. Also fuel injected early on in the compression stroke, particularly at low engine speed, when the air jet 20 is weak, or fuel injected during the preceding induction stroke, can enter cylinder 2 through the orifice and evaporate therein. Later on in the compression stroke this mixture will be delivered into the combustion chamber by the piston. Additional fuel added to the air jet near the end of the compression stroke can be controlled to form an ignitable mixture.

Figure 3:
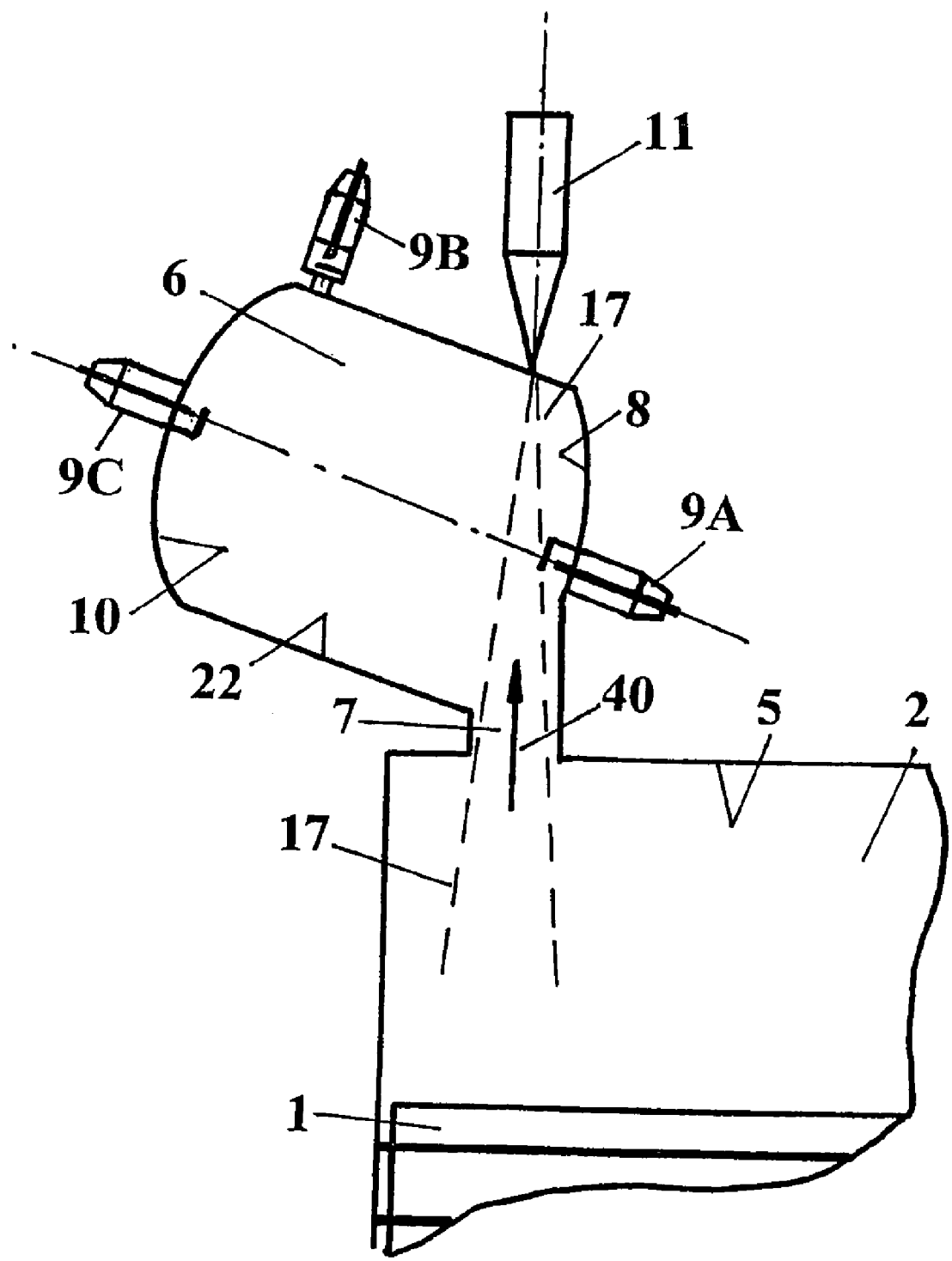
FIG. 3 is a sectional elevation of part of a cylinder and a combustion chamber with a fuel delivery similar to that shown in FIG. 2 but with a combustion chamber inclined to the axis of the cylinder and showing alternative spark plug positions.

A design chosen according to FIG. 2 or FIG. 3 need not use a cavity in the piston crown as shown in FIG. 2. However engines designed to allow a large proportion of the engine clearance volume to be in cavity 100 will result in a substantial reduction of combustion chamber volume in order to maintain a desired compression ratio. In such an engine, during idling and low BMEP the combustion chamber 6 can be designed to receive all the fuel needed by injecting the fuel near the end of the compression stroke. At higher BMEP additional fuel can be injected earlier into the cylinder through orifice 7 to form a mixture in cavity 100 at the end of the compression stroke. In this form the combustion chamber operates primarily in a lean mixture igniter mode for cavity 100. If the mixture in cavity 100 is excessively lean and can not be ignited by the flame leaving the combustion chamber after ignition, an engine constructed to operate in this mode may be found to need to use partial throttling of the air intake over a range of low BMEP conditions but such throttling will be less severe in comparison with conventional gasoline engines operating at the same BMEP.

FIG. 3 illustrates a fuel injector 11 aligned with the air jet 40. In this embodiment the combustion chamber axis is inclined to the cylinder axis to reduce the axial component of helical swirl. Fuel cone 17 is shown penetrating into cylinder 2 during the early part of the compression stroke when the air jet 40 is weak. The diagram also illustrates various spark plug positions which may assist designers to meet optimum engine performance. Position 9A may be found suitable to ignite a mixture formed late in the compression stroke when the mixture is stratified at the near end 8 of the combustion chamber 6. Such arrangement may suit idling and starting conditions for an engine designed according to this embodiment or suit an engine designed to operate in the igniter mode described above.

Positions 9B or 9C can be chosen as alternatives or in addition to position 9A, using two spark plugs per cylinder, if this is found necessary in order to cope with a wide fuelling range. Spark plug 9B is shown situated in an ignition pot, where it is shielded. Other spark plug positions or arrangements may be found in preference to the ones shown in FIG. 3.

Figure 4:
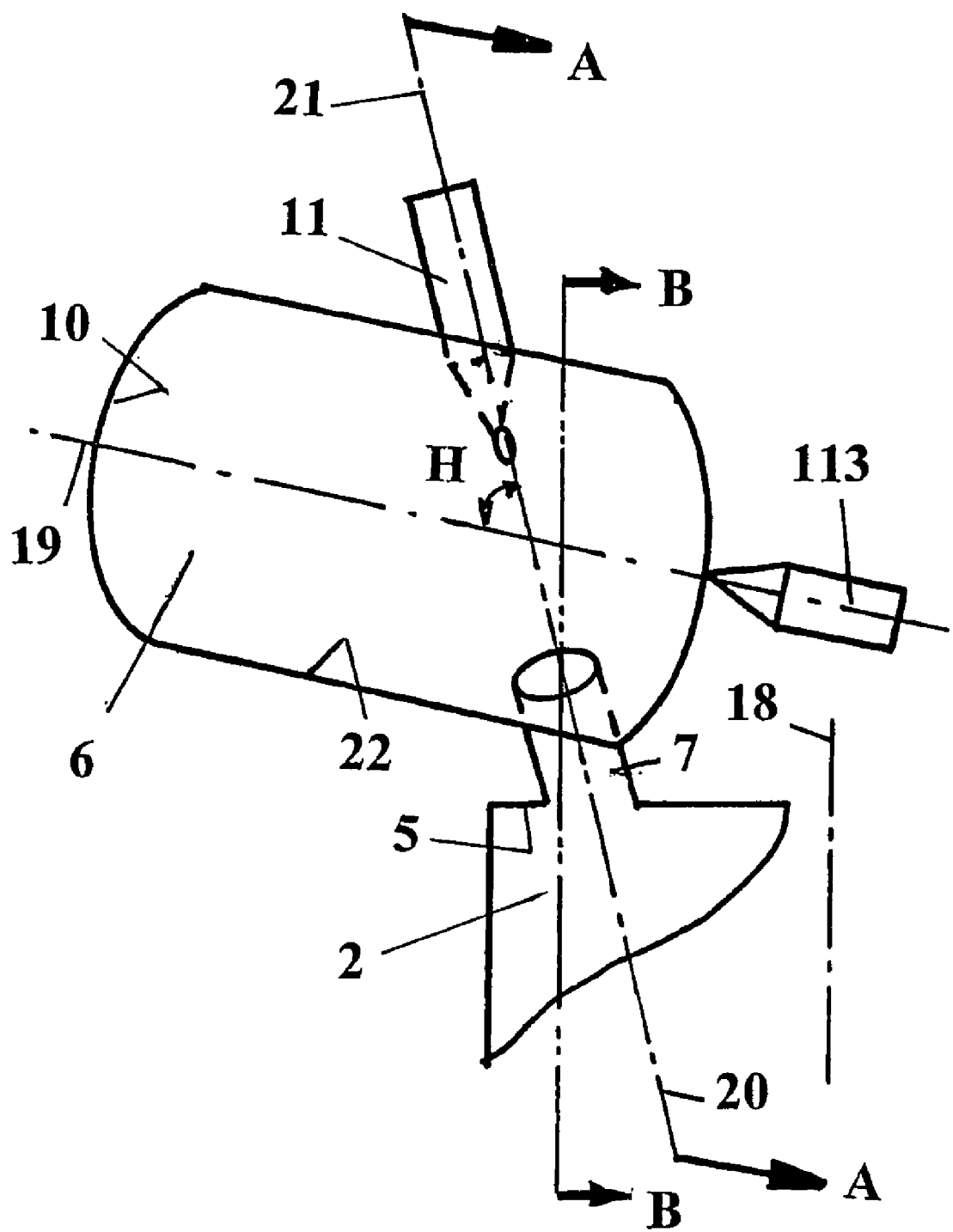
FIG. 4 illustrates a combustion chamber inclined to the axis of the cylinder showing orifice location and two alternative positions for the fuel injector.

FIGS. 4 to 8 illustrate the geometry of a combustion chamber in relation to an orifice which is designed to promote helical swirl. The arrangement shown in FIG. 2 can cause helical swirl with an excessive axial component since the inclination H of orifice 7 to axis 19 is relatively small. In FIG. 4 the inclination angle H, is larger and this reduces the axial velocity component of helical swirl.

The tangential velocity component of helical swirl is determined by angle V between axis 20 and axis 18 shown in the sectional view of FIG. 5. This controls the angular velocity of the swirl for a given jet velocity. A tangential entry illustrated in FIG. 5 will provide a maximum value.

The cross sectional area of orifice 7 will determine the velocity of the air jet. It is advantageous to maximise this area in order to reduce the pumping losses when gases move between the cylinder 2 and combustion chamber 6 and by doing so it was found that such losses can be kept to low values.

FIGS. 4 and 5 do not show positions for the spark plug, instead they illustrate some alternative positions for fuel injectors according to this invention since the orientation of the injectors, 112, 113 and 11 are all dependent upon the position of orifice 7. More than one fuel injector can be used if desired.

FIG. 6 illustrates a method for controlling the intensity of the angular velocity component of helical swirl. The axis 20 of orifice 7 is displaced from the diameter 18 which is parallel to it. Displacing the air jet from the periphery 22 by distance X will reduce the swirl intensity. If the jet diameter is allowed to extend beyond diameter 18 by an amount Y, the angular intensity will be greatly reduced since part of the air jet will oppose the direction of rotation of helical swirl. When axis 20 coincides with diameter 18 there will be no swirl motion.

Figure 7:
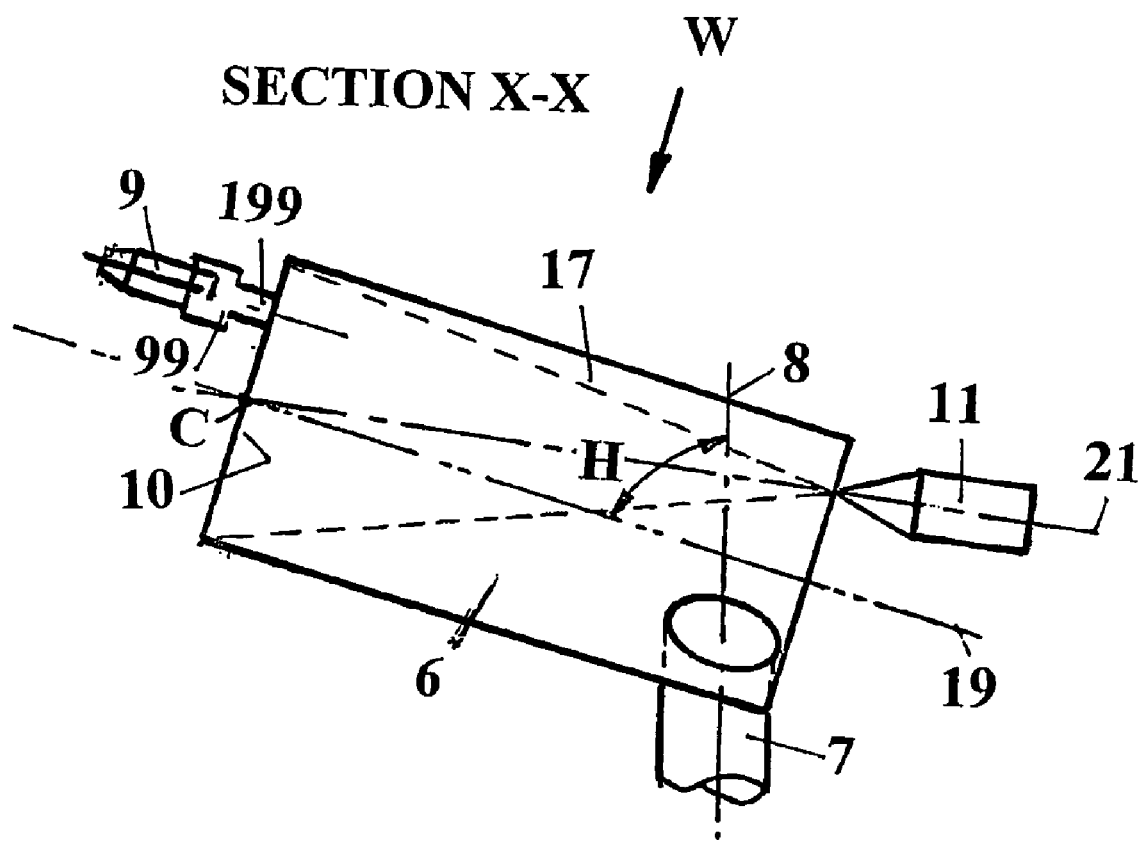
FIG. 7 illustrates a sectional elevation along the lines X—X of FIG. 8, showing details of a combustion chamber where the fuel injection takes place across the path of the air jet.
Figure 8:
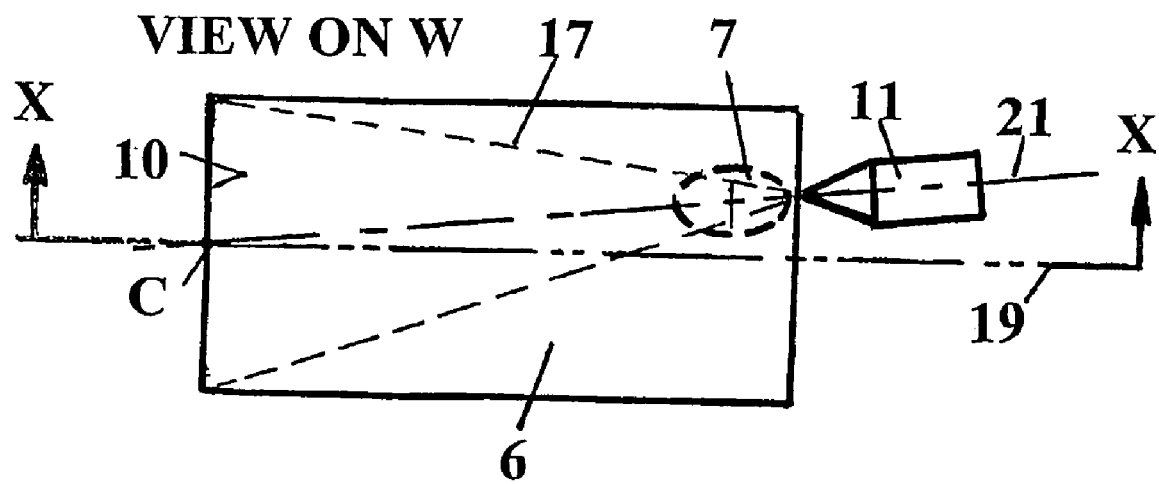
FIG. 8 illustrates a plan view of FIG. 7.

FIG. 7 and FIG. 8 illustrate the relative positions of the orifice, the fuel injector and spark plug for a preferred embodiment of this engine which was built and tested. This engine can idle unthrottled.

In plan view, FIG. 8 the injector axis 21 is shown passing near the centre of orifice 7 pointing towards the centre C of the far end 10 of the combustion chamber 6. Orifice 7 is shown to one side of axis 19 in order to promote a tangential component to the helical swirl flow, the axial component is provided by the inclination angle H being less than ninety degrees. FIG. 7 shows the injector positioned to deliver fuel spray 17 to the air jet from a position above orifice 7 again in a direction towards centre C at the far end. Where necessary to avoid liquid fuel being deposited on spark plug 9 (which can cause a short circuit) the spark plug is placed inside an ignition pot 99 which communicates with the combustion chamber through orifice 199 which can be either axial or inclined to the axis of the spark plug. This device may prove to be necessary to enable cold starts.

The far end face 10 of the combustion chamber may be shaped. For example it may be flat, concave or convex. It may be provided with surface projections shaped so as to induce turbulence and/or promote mixing of peripheral gas flow towards the centre of the chamber at the far end if this proves necessary. The peripheral wall of the combustion chamber 22 may also be provided with surface undulations and surface projections to promote turbulence if this proves necessary.

Figure 9:
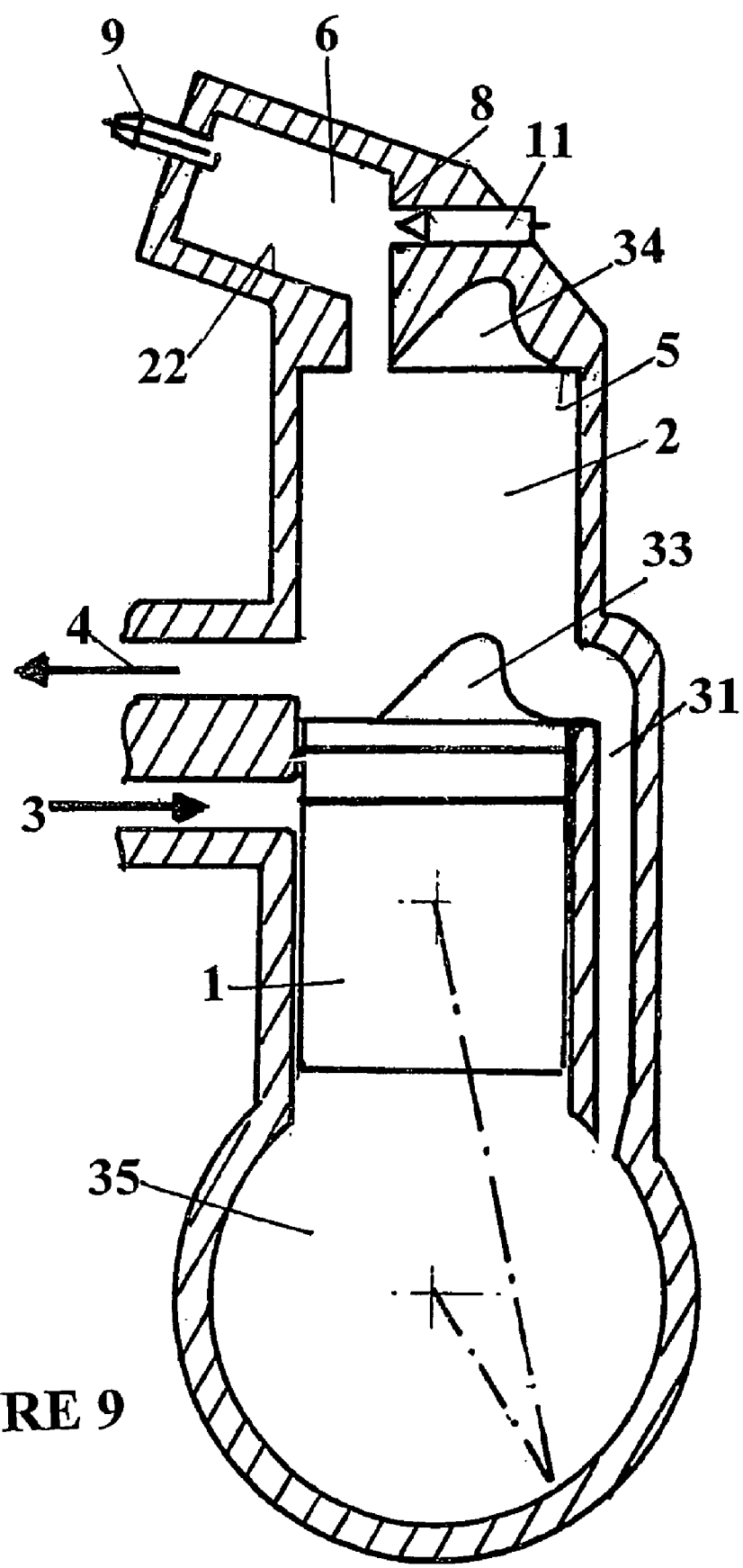
FIG. 9 illustrates one embodiment of a two stroke engine constructed according to this invention.

FIG. 9 illustrates the application of this invention to one embodiment of a two stroke engine when modified to take advantage of the improvements according to this invention.

Air enters the crankcase through inlet port 3 provided with a non return valve 30 during the compression stroke of piston 1. Unlike conventional two stroke engines the air intake is left unthrottled at part load and is not mixed with any fuel. When the transfer port 31 is uncovered by the piston near the end of its subsequent expansion stroke the air is transferred into cylinder 2 and is deflected into a loop scavenge flow direction by projection 33 situated on the crown of piston 1. The fuel injector 11 can start injecting fuel into combustion chamber 6 when the piston covers the exhaust port 4 during the early part of its compression stroke, or even earlier. When required, to increase BMEP, the fuel injector can continue to do so until near the end of the compression stroke.

It is advantageous to minimise the volume in cylinder 2 at the end of the compression stroke in order to deliver the maximum amount of air into the combustion chamber and the shapes of projection 33 and recess 34 can be made similar in order to achieve this aim.

This arrangement removes disadvantages inherent in the conventional two stroke design, one being the presence of fuel in cylinder 2 during the blow down period, and the other being the need to throttle the air intake at part load. The stratified charge capability and efficient fuel preparation can offer a two stroke engine modified according to this invention much improved thermal efficiency, cleaner exhaust and high speed operation.

The invention claimed is:

1. An internal combustion engine comprising
   a piston reciprocating in a cylinder;
   air inlet means communicating with the cylinder;
   exhaust means communicating with the cylinder;
   a substantially cylindrical indirect combustion chamber communicating with the cylinder comprising a near end and a far end in relation to the piston;
   a transfer orifice communicating with the cylinder and the combustion chamber at its near end;
   spark ignition means located at the far end of the combustion chamber;
   a fuel injector communicating with the combustion chamber;
   a controller to control the fuel injection process and spark ignition event;
   characterised in that the transfer orifice is adapted to deliver a jet of air into the combustion chamber during the compression stroke of the piston forcing air movement around the periphery of the combustion chamber in helical swirl motion in which the jet of air has a tangential velocity component around the combustion chamber and an axial velocity component along the combustion chamber, the axial velocity component being directed away from the near end and towards the far end, and in that the fuel injector is adapted to deliver some fuel into the said jet of air within the chamber in a direction which also enables a spark ignitable mixture to form in the gas arriving at the spark ignition means.

2. An engine according to claim 1, wherein the fuel injector is situated to deliver fuel into the jet of air at an angle to the axis of the jet of air.

3. An engine according to claim 1 wherein the fuel injector is situated to direct fuel delivery towards the far end of the combustion chamber.

4. An engine according to claim 1 wherein the piston has a crown, and wherein the crown has a cavity.

5. An internal combustion engine comprising
a piston reciprocating in a cylinder;
air inlet means communicating with the cylinder;
exhaust means communicating with the cylinder;
an indirect combustion chamber communicating with the cylinder comprising a near end and a far end in relation to the piston;
a transfer orifice communicating with the cylinder and the combustion chamber at its near end;
spark ignition means communicating with the combustion chamber;
a fuel injector communicating with the combustion chamber;
a controller to control the fuel injection process and spark ignition event;
characterised in that the transfer orifice is adapted to deliver a jet of air into the combustion chamber during the compression stroke of the piston forcing air movement around the periphery of the combustion chamber in helical swirl motion, and in that the fuel injector is adapted to deliver some fuel into the said jet of air within the chamber in a direction which also enables a spark ignitable mixture to form in the gas arriving at the spark ignition means,
wherein the fuel injector is situated to deliver fuel directly towards the said jet of air along an axis coincident with the axis of the said jet.

6. An engine according to claim 1 wherein two spark ignition means are used to effect ignition at two different locations.

7. An engine according to claim 1 operating on the two stroke cycle.

8. An engine according to claim 1 operating on the four stroke cycle.

9. An engine according to claim 1 wherein the air intake into the cylinder is not restricted.

10. An internal combustion engine comprising
a piston reciprocating in a cylinder;
air inlet means communicating with the cylinder;
exhaust means communicating with the cylinder;
an indirect combustion chamber communicating with the cylinder comprising a near end and a far end in relation to the piston;
a transfer orifice communicating with the cylinder and the combustion chamber at its near end;
spark ignition means communicating with the combustion chamber;
a fuel injector communicating with the combustion chamber;
a controller to control the fuel injection process and spark ignition event;
characterised in that the transfer orifice is adapted to deliver a jet of air into the combustion chamber during the compression stroke of the piston forcing air movement around the periphery of the combustion chamber in helical swirl motion, and in that the fuel injector is adapted to deliver some fuel into the said jet of air within the chamber in a direction which also enables a spark ignitable mixture to form in the gas arriving at the spark ignition means,
wherein the fuel injector is situated to deliver fuel directly towards the said jet of air along an axis parallel to the axis of the said jet.

* * * * *